UNITED STATES PATENT OFFICE.

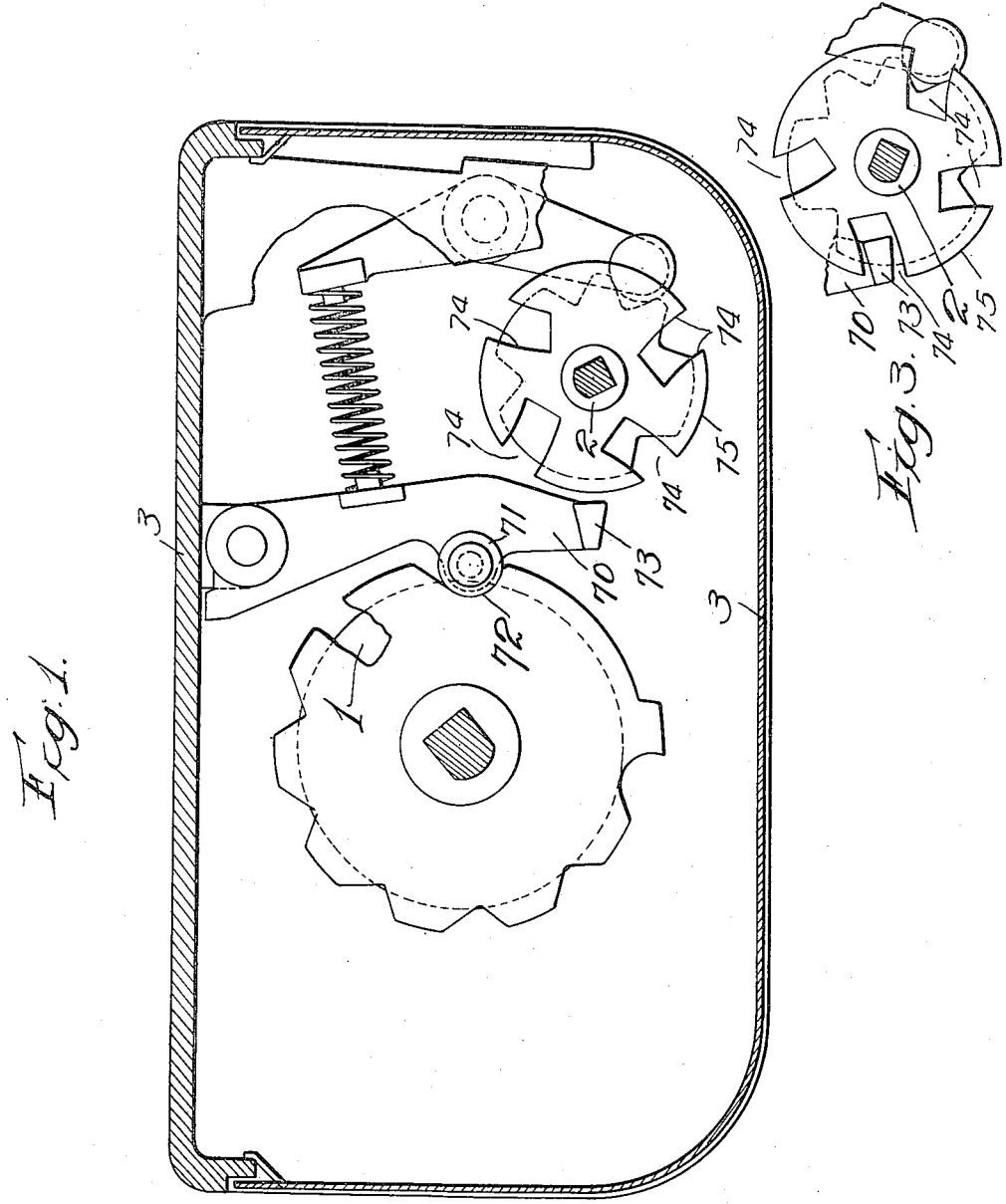

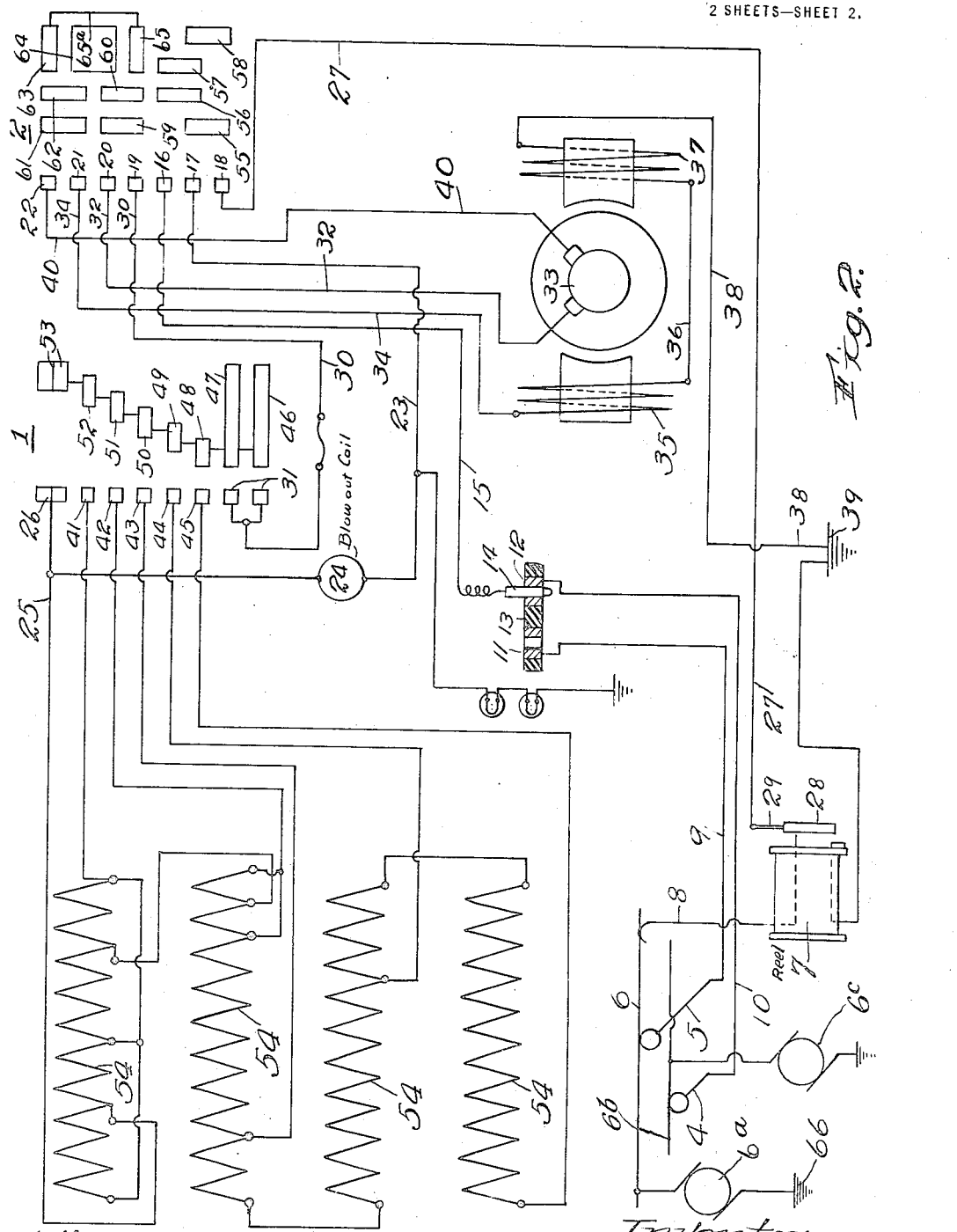

SIDNEY W. FARNHAM, OF CHICAGO, ILLINOIS, ASSIGNOR TO GOODMAN MANUFACTURING COMPANY, OF CHICAGO, ILLINOIS, A CORPORATION OF ILLINOIS.

CONTROLLING DEVICE FOR ELECTRIC LOCOMOTIVES.

1,425,375.   Specification of Letters Patent.   Patented Aug. 8, 1922.

Application filed January 22, 1916. Serial No. 73,597.

*To all whom it may concern:*

Be it known that I, SIDNEY W. FARNHAM, a citizen of the United States, residing at Chicago, in the county of Cook and State of Illinois, have invented a certain new and useful Improvement in Controlling Devices for Electric Locomotives, of which the following is a specification.

This invention relates to controlling devices for electric locomotives, and has for its object to provide a new and improved device of this description particularly adapted for mining locomotives adapted to receive their current from either of two sources of supply, such as a trolley pole or a gathering reel, and which permits the easy connection and disconnection of the motor with either the trolley or the reel, without danger to the operator or apparatus.

The invention is illustrated in the accompanying drawings, wherein—

Figure 1 is a plan view of a controller embodying the invention;

Figure 2 is a diagrammatic view showing the various parts of the controller together with the circuits connecting the contacts of the controller with the resistance, motor, trolley and reel.

Figure 3 is a plan view of the top of the reversing drum when moved to a position where the controlling drum 1 is released.

Like numerals refer to like parts throughout the several figures.

The controller consists of a rotary drum 1, containing contacts which co-operate with stationary contacts for controlling the motor circuit and a rotary drum 2 carrying contacts which co-operate with stationary contacts for reversing the motor. These drums are mounted in a suitable casing 3, and are arranged so that they can be independently rotated, the drum 1 being moved to control the motor and the drum 2 being moved when it is desired to change the direction of rotation of the motor.

In Fig. 2 I have illustrated diagrammatically the circuits and various parts, including the motor, trolleys and reel. I have shown this circuit as applied to a locomotive containing two trolleys 4 and 5. These trolleys make contact with a trolley wire 6 and a trolley wire $6^b$, each connected with a source of electric supply. The sources of electric supply are indicated diagrammatically at $6^a$ and $6^c$. The gathering reel 7 has a conductor wrapped about it with an end 8 adapted to be hooked over the trolley wire so that the motor can be moved back into a room or other space at a distance from the trolley wire, the conductor unwinding so as to keep the motor connected with the source of electric supply in all the various positions of the locomotive. The trolleys 4 and 5 are connected by conductors 9 and 10 with the two insulated contacts 11 and 12 connected with the part 13. A trolley plug 14 is arranged to make contact with either of these contacts, there being two holes in the part 13 for this plug, arranged so that when the plug is in one hole connection is made with the contact 12, and when in the other hole, connection is made to the contact 11. A conductor 15 leads from the plug 14 to one of the stationary contacts 16 associated with the reversing drum 2. Associated with this drum are a series of other stationary contacts 17, 18, 19, 20, 21 and 22. The contact 17 is connected by conductor 23 through blow-out coil 24 with the conductor 25 connecting with the stationary contact 26 associated with the motor controlling drum 1. The contact 18 is connected by a conductor 27 with the conductor on the reel 7, the connection being made in any desired manner, as by means of a contact ring 28 and a brush 29. The contact 19 is connected by a conductor 30 with the stationary contacts 31 associated with the drum 1. The contact 20 is connected by a conductor 32 with the armature 33 of the motor. The contact 21 is connected by a conductor 34 with the field coil 35 of the motor, said field coil being connected by conductor 36 with the field coil 37, which in turn is connected by conductor 38 to the ground 39. The contact 22 is connected by conductor 40 with the armature of the motor. The drum 1, in addition to the stationary contacts 26 and 31, has the stationary contacts 41, 42, 43, 44 and 45. These stationary contacts co-operate with the movable contacts on the drum 1, that is, the contacts 46, 47, 48, 49, 50, 51, 52 and 53. When these latter contacts on the drum are moved successively into contact with their opposed stationary contacts, the first movement completes the circuit through the motor and the resistance 54, and the continued movement gradually cuts out the resistance. The reversing drum 2 is provided with a series of contacts 55, 56, 57, 58, 59, 60, 61, 62, 63, 64 and 65. When the drum 2 is moved so that contact 55 engages contacts 17 and 18 so as to connect them together, the current is supplied to the motor through the reel 7 so as to cause the motor to rotate in a forward direction. At the same time the contact 59 connects contacts 19 and 20, while contact 61 connects contacts 21 and 22.

The circuit is then traced as follows: from the generator 6ª to the trolley wire 6, thence from the end 8 of the conductor on the reel, through said conductor, and thence by conductor 27 to contact 18, thence by contact 55 to contact 17, and thence by conductor 23 to conductor 25. If now the contacts on the drum 1 are moved so that contact 53 engages contact 26, all the resistance is cut out of the motor circuit and the current then passes from conductor 25 through the contacts 26 to contact 53, and then since all the contacts on the drum 1 are electrically connected together the current passes successively through these contacts to the contacts 46 and 47 and then passes by contacts 31 to conductor 30 and thence to stationary contact 19 associated with the reversing drum, and thence through contact 59 to contact 20, and thence by conductor 32 to the armature 33 of the motor, thence by conductor 40 to contact 22, thence through contact 61 to contact 21, and thence by conductor 34 to the field 35, and thence through conductor 36 to field 37, and thence through conductor 38 to ground 39, and thence to ground 66, and thence to generator 6ª, the motor then rotating in a forward direction. If it is desired to disconnect the motor from the reel and connect it with one of the trolleys, the drum 1 is moved so that the contacts are in the position shown in Fig. 2, thereby disconnecting the motor from the source of current supply, and the drum 2 is moved until the contacts previously in contact are disconnected and the contact 56 connects contacts 16 and 17 and contact 60 connects contacts 19 and 20 and contacts 62 connects contacts 21 and 22. The drum 1 is then moved to start the motor and gradually cut out the resistance. The circuit is then traced as follows: from trolley 4 through conductor 10, to contact 12 and plug 14. (If it is desired to connect with trolley 5 instead of trolley 4, the plug 14 is moved to connect with contact 11.) The current passes from plug 4 through conductor 15 to contact 16, and thence through contact 56 to contact 17, thence through conductor 23 to conductor 25, and when the resistance is all cut out of the armture, to contact 26 and thence to contact 53, thence through the contacts on the drum 1, to contacts 46 and 47, thence to contacts 36, thence through the conductor 30 to contact 19, thence through contact 59 to contact 20, thence through conductor 32 to the armature 33, thence by conductor 40 to contact 22, thence through contact 61 to contact 21, thence through conductor 34 to the fields 35 and 37 of the motor, thence by conductor 38 to ground 39, thence to ground 36, and thence back to motor 6ᶜ. The armature of the motor is now rotating in a forward direction. If now it is desired to reverse the motor while connected with either of the trolleys, the motor is cut out of circuit by moving the drum 1 so that the contacts are in the position shown in Fig. 2, and then the drum 2 is moved so that contact 57 connects contacts 16 and 17 and contact 65 engages contact 19 and contact 64 connects contacts 20 and 21 and contact 63 engages contact 22. The drum 1 is then moved to connect the motor in circuit and gradually cut out the resistance.

The circuit is then traced as follows: from generator 6ᶜ to trolley wire 6ᵇ, thence through trolley 4 and conductor 10 to contact 12 and plug 14, thence by conductor 15 to contact 16, thence by contact 57 to contact 17, thence by conductor 23 to conductor 25, thence through contact 26 to contact 53, thence to contacts 46 and 47, thence to contacts 36, thence by conductor 30 to contact 19, thence to contact 65, thence through conductor 65ª to contact 63, thence to contact 22, thence by conductor 40 to the armature 33 of the motor, the current then being reversed through the armature, thence through conductor 32 to contact 20, thence by contacts 64 to contact 21, thence by conductor 34 to the field coils 35 and 37 of the motor, thence by conductor 38 to ground 39, thence to ground 66 and thence back to the generator 6ᶜ.

If now it is desired to connect the motor with the reel 7 and still have the motor running in a reverse direction, the current is shut off by moving the drum 1 to disconnect the motor from the source of current supply and then the drum 2 is moved to connect the contact 58 with contacts 17 and 18, the remaining contacts being connected the same as before. The motor is then started up by moving the drum 1 as before described.

The current can then be traced as follows: from generator 6ª to trolley wire 6, thence through the end 8 of the conductor on the reel, thence through said conductor, thence by conductor 27 to contact 18, thence through contact 58 to contact 17, thence by conductor 23 to conductor 25, thence to contact 26, thence to contact 53, thence through the contacts on the drum 1, to contacts 46 and 47, thence to contacts 36, thence through conductor 30 to contact 19, thence to contact 65, conductor 65ª and contact 63 to contact 22, thence by conductor 40 to the armature 33 of the motor, the current still running the reverse direction through the armature, thence by conductor 32 to contact 20, thence by contact 64 to contact 21, thence by conductor 34 to fields 35 and 37 of the motor, thence by conductor 38 to ground 39, thence to ground 66 and thence back to generator 6ª.

If it is desired to connect the motor with the trolley 5, the pin 14 is disconnected from the contact 12 and connected with the contact 11. The drums 1 and 2 are arranged so that the drum 2 cannot be turned to reverse the current through the motor while the drum 1 is in a position to connect the motor in circuit so that before the drum 2 can be turned the drum 1 must be brought back to its inital position. Any suitable means for this purpose may be used. As herein shown, a pivoted lever 70 is associated with the drum 1 and is provided with a part 71 preferably a roller, which fits into a notch 72 in the drum or a part associated therewith. The lever 70 is provided with an upstanding stop piece 73, which engages the periphery of the part 75 connected with the drum 2 when the drum is in its initial position so as to prevent the parts 71 from being removed from the notch 72. The part 75 is provided with a series of notches 74. When the drum is turned so that one of these notches comes opposite the upstanding stop 73, the lever 70 can be moved, the stop passing into one of these notches, as shown in Fig. 3, the lever itself passing under the part 75. This locks the reversing drum 2 but releases the controlling drum 1 so that it can be turned to complete the circuit through the motor and then vary the resistance in said circuit. It will be noted that the bottom portion of the notch 72 passes beyond the plane of the periphery of the drum (see Fig. 1) and the parts are so arranged that it is only when this part passes into this deep notch that the drum 2 may be released. During all the movements of the drum 1 when the part 71 is out of the notch 72, the lever 70 is held in such position that the stop 73 will never be withdrawn from the notch 74 into which it is at that time received. The part containing the notch 72 is provided with a series of other notches clearly illustrated in Fig. 1 into which the part 71 passes as the drum is rotated, so as to hold the drum in any desired position, but these notches are not deep enough to permit the removal of the stop 73 from its receiving notch 74. It will thus be seen that when the drum 1 is free to turn, the drum 2 is locked against turning, and that when the drum 2 is free to turn, the drum 1 is locked against turning, thereby preventing the reversal of the current through the motor while the circuit is completed, and preventing the current from being turned on until the reversing drum is locked against movement. The reversing drum is locked during all positions of the drum 1 except its initial position, where the circuit through the motor is broken. By means of this device the motor may be connected by a plurality of connections with a source of electric supply and this connection may be made easily and quickly by manipulating the ordinary controller that controls the motor, and it will be seen that it is impossible to change from one connection to the other while the motor is in circuit, thereby eliminating danger to the operator and to the apparatus.

Certain of the contacts on drum 2, that is, contacts 16, 17, 18, 55, 56, 57 and 58 form what may be termed a multiple pole switch for connecting one of a plurality of sources of electric supply with the resistance of the controller, the other contacts on said drum forming the motor reversing contacts. It will be noted that I have provided a controlling device wherein there is a resistance short circuiting drum and motor reversing drum, and a multiple pole switch for connecting one of a plurality of sources of current supply to said resistance.

I have described in detail a particular construction embodying the invention, but it is of course evident that the parts may be varied in many particulars without departing from the spirit of my invention, and I therefore do not limit myself to the particular construction shown.

I claim:

1. The combination with an electric locomotive having a motor adapted to be connected in circuit either with a trolley or a gathering reel, of a controller for said motor comprising two drums each having a series of contacts, a resistance controlled by one of said drums, the other drum being a reversing drum to reverse the motor, said reversing drum having two contacts associated therewith, one connected with the trolley and the other with the gathering reel and co-operating contacts adapted when the drum is moved to predetermined positions, to connect the motor with either the trolley or the gathering reel either when the motor is running forward or backward.

2. The combination with an electric motor, of two separate connections for connecting it with the source of current supply, a controller for said motor comprising two elements adapted to be separately operated, a resistance controlled by one of said elements, the other element being a reversing element, a series of contacts associated with said reversing element and connected with said two connections leading to the source of current supply and with the motor whereby by moving the contacts to predetermined positions the motor may be connected to the source of electric supply through either of said connections when the motor is running either forward or backward.

3. The combination with an electric motor of a motor circuit, a controller for controlling said motor circuit, a casing for said controller, two sources of electric supply, a device within the casing of the controller for connecting the motor circuit with either of said sources of electric supply and means for controlling said latter device from the exterior of the casing.

4. The combination with an electric locomotive having a motor adapted to be connected in circuit either with a trolley or a gathering reel, of a controller for said motor, comprising two drums each having a series of contacts, a resistance controlled by one of said drums, the other drum being a reversing drum to reverse the motor, said reversing drum having two contacts associated therewith, one connected with the trolley and the other with the gathering reel and co-operating contacts adapted when the drum is moved to predetermined positions, to connect the motor with either the trolley or the gathering reel either when the motor is running forward or backward, and means for preventing the connection of the motor from being changed from the trolley to the reel while the circuit controlled by the resistance controlling drum is completed.

5. The combination with an electric motor, of two separate connections for connecting it with the source of current supply, a controller for said motor comprising two elements adapted to be separately operated, a resistance controlled by one of said elements, the other element being a reversing element, a series of contacts associated with said reversing element and connected with said two connections leading to the source of current supply and with the motor whereby by moving the contacts to predetermined positions the motor may be connected to the source of electric supply through either of said connections when the motor is running either forward or backward, and means for preventing the connection of the motor from being changed from one of said connections to the other until the circuit through the motor is broken.

6. The combination with an electric motor of a motor circuit, a controller for controlling said motor circuit, a casing for said controller, two sources of electric supply, a device within the casing of the controller for connecting the motor circuit with either of said sources of electric supply, an interlocking connection between said device and said controller for preventing said devices from being moved to open the circuit while the controller is in a position which closes the circuit, and means for controlling said latter device from the exterior of the casing.

7. A controlling device for electric motors comprising a resistance short circuiting drum, a motor reversing drum, and a multiple pole switch for connecting one of a plurality of sources of current supply to said resistance, said multiple pole switch comprising a series of contacts mounted upon said motor reversing drum.

In testimony whereof, I affix my signature in the presence of two witnesses this 7th day of January, 1916.

SIDNEY W. FARNHAM.

Witnesses:
MINNIE M. LINDENAU,
CHRISTINA DEANS.